US 6,547,327 B1

(12) United States Patent
Yates

(10) Patent No.: US 6,547,327 B1
(45) Date of Patent: Apr. 15, 2003

(54) BREATHABLE CUSHION

(76) Inventor: Paul M. Yates, 5814 Briar Tree, La Canada, CA (US) 91011

( * ) Notice: Subject to any disclaimer, the term of this patent is extended or adjusted under 35 U.S.C. 154(b) by 0 days.

(21) Appl. No.: 09/904,047

(22) Filed: Jul. 11, 2001

(51) Int. Cl.[7] .............................. B62J 1/18; B62J 1/20; B62J 1/22
(52) U.S. Cl. ................. 297/214; 297/200; 297/452.41; 297/219.11
(58) Field of Search ................. 297/214, 200, 297/219.11, 452.41

(56) References Cited

U.S. PATENT DOCUMENTS

| | | | | |
|---|---|---|---|---|
| 3,807,793 A | * | 4/1974 | Jacobs | 297/214 |
| 3,997,214 A | * | 12/1976 | Jacobs | 297/214 |
| 4,815,361 A | * | 3/1989 | Chiarella | 297/214 X |
| 5,318,344 A | * | 6/1994 | Wang | 297/214 X |
| 5,419,612 A | * | 5/1995 | Rassekhi | 297/200 |
| 5,429,852 A | * | 7/1995 | Quinn | 297/452.41 X |
| 5,738,406 A | * | 4/1998 | Deus | 297/200 |
| 5,857,749 A | * | 1/1999 | DeBellis et al. | 297/452.41 |
| 6,030,035 A | * | 2/2000 | Yates | 297/214 |
| 6,131,994 A | * | 10/2000 | Yates | 297/214 |
| 6,206,474 B1 | * | 3/2001 | Kruse et al. | 297/452.41 |
| 6,409,865 B1 | * | 6/2002 | Yates | 297/214 X |

* cited by examiner

Primary Examiner—Peter R. Brown
Assistant Examiner—Rodney B. White
(74) Attorney, Agent, or Firm—Walter A. Hackler

(57) ABSTRACT

A breathable cushion includes a base sheet having a circumference in a matrix of openings therethrough along with a cover sheet having a matrix of openings aligned with the base sheet openings and sealed to the base sheet along the base sheet circumference. A gel is disposed between the base and cover sheets with the gel being continuous between the base sheet and the cover sheet openings. The cover sheet is sealed to the base sheet or on each of the base sheet openings for forming a matrix of pockets with each pocket surrounding a sheet opening.

4 Claims, 1 Drawing Sheet

BREATHABLE CUSHION

The present invention generally relates to cushions and is more particularly directed to a breathable cushion suitable in applications where venting is desired, such as, for example, pads for bicycle saddles, footwear, clothing pads and seat pads to name as few.

Cushioning devices having liquid or gel filled bladders, have been developed in an attempt to provide more comfortable, more durable support. A major problem associated with the support of a body part, is related to the cooling requirements therefore. Many gels and foams may be utilized for cushioning pads, however, constant contact with a body part prevents airflow adjacent the body part and accordingly the buildup of heat and perspiration results in discomfort.

The present invention provides an improved filled cell type cushioning devices with structure enabling high impact and ventilation to areas contacted by the cushion.

SUMMARY OF THE INVENTION

A breathable cushion in accordance with the present invention generally includes a base sheet having a periphery matrix of openings therethrough. A cover sheet is provided having a matrix of openings aligned with the matrix of the base sheet openings and banded to the base sheet along the base sheet periphery.

A material having gel like properties (hereinafter refernced to as "gel") is disposed between the base and the cover sheets with the gel being continuous between the base sheet and the cover sheet openings. This features provides for continuous support of the body part.

The cover sheet is sealed, or bonded, to the base sheet around each of the base sheet openings to form a matrix of pockets. Each of the pockets surround a base sheet and a cover sheet opening thereby enabling air passage, or ventilation through the cushion. This structure enables the cushion to withstand high impact or load without "bottoming out" as in the case with present contour gel cushions.

To inhibit the closure of openings by a body part in contact with the cushion, each pocket has a generally rectilinear cross-section, preferably a square cross-section. Preferably the matrix of base sheet and cover sheet openings is rectilinear, and diagonals of each of the square cross-sectional pockets are aligned with one another. This structure facilitates bending of the cushion to conform it to a curvilinear surface.

The base and cover sheets may have an elongate shape with a longitudinal axis and a transverse axis. Preferably, the pocket diagonals are parallel with a longitudinal and transverse axis and each pocket has a width, measured along the pocket diagonal, which is greater than a distance between adjacent pockets measured along the pocket diagonals. This structural arrangement further facilitates the pliability of the cushion.

BRIEF DESCRIPTION OF THE DRAWINGS

The present invention may be more clearly understood with reference to the following detailed description, in conjunction with the appended drawings of which.

DETAILED DESCRIPTION

Figure 1:
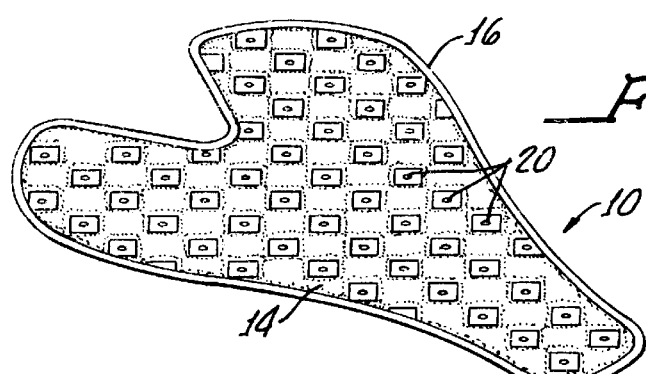
FIG. 1 is a perspective view of one embodiment of the present invention generally showing, by way of example only, a cushion having the general shape of a bicycle saddle and a cover sheet with a plurality of holes or openings therethrough surrounding by rectangular, or square pockets.
Figure 2:
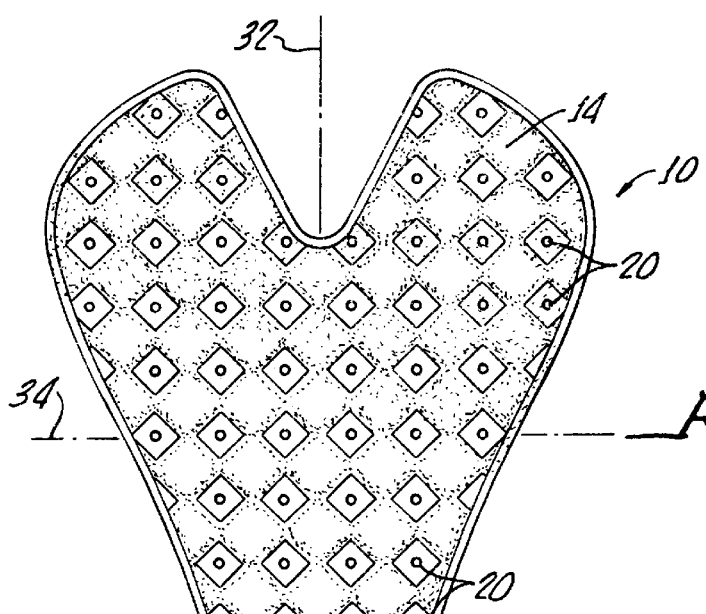
FIG. 2 is a plan view of the cushion shown in FIG. 1 more clearly illustrating the rectangular shape of the pockets and their alignment with one another and longitudinal and transverse axis of the cushion.
Figure 3:
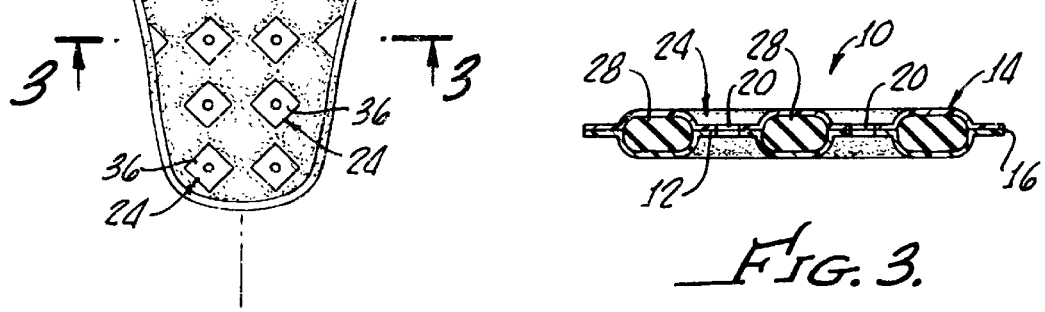
FIG. 3 is a cross-sectional view taken along the line 33, FIG. 2 move clearly showing a base sheet, cover sheet and gel disposed therebetween along with pockets aligned with openings through the cover sheet and base sheet.

With reference to FIGS. 1, 2 and 3, there is shown a breathable cushion 10 in accordance with the present invention which generally includes a base sheet 12 and a cover sheet 14 each sharing a common periphery 16 and sealed together along the periphery 16.

Each of the base sheet 12 and cover sheet 14 include a matrix openings 20 therethrough for enabling venting through the cushion. The cover sheet 14 is also sealed to the base sheet around each of the openings 20 to provide a matrix of pockets 24. Resiliency of the cushion 10 is provided by a gel 28 disposed between the base sheet 12 and cover sheet 14. The gel 28 is continuous between the base sheet 12 and cover sheet 14 except across the openings 20. This enables uniform resiliency of the cushion 10.

It should be appreciate that the term gel is used herein means any gel-like material having the resilient qualities of gel whether or not the gel-like material is considered by way of chemical or physical description to be a true gel. Suitable gels that are used in the present invention are set forth in the U.S. Pat. No. 6,027,674 to Yates and is to be incorporated herewith in its entirety by the specific reference thereto for teaching suitable gels.

As more clearly shown in FIG. 2, each of the pockets 24 having a generally rectangular cross-section, preferably a square cross-section. It has been found that this configuration inhibits sealing of the pockets, thus enabling proper ventilation of large body areas when in contact with the cushion 10.

As shown in FIGS. 1 and 2, the matrix of the openings 20 is also rectilinear.

The cushion 10 shown in FIGS. 1 and 2, may have an elongate shape with a longitudinal axis 32 and a transverse axis 34. As best shown in FIG. 2, diagonals 36 of the pockets 24 are parallel with the longitudinal axis 32 with normal diagonals 38 being parallel with the transverse axis 34. This structure facilitates the flexibility and conformability of the cushion with a rectilinear surface such as that of a formed bicycle saddle, not shown.

In that regard, as shown, each pocket 24 has a width measured along the pocket diagonal 36 which is greater than a distance between adjacent pockets 24 measured along the pocket diagonal. This structure is utilized to alter the resiliency of the cushion and also tailor the flexibility or conformability of the cushion 10 a curved surface, not shown.

Fabrication of the cushion 10 may be made in accordance with U.S. Pat. Nos. 5,679,193, 5,756,184, 5,932,046, 5,993, 584, 6,017,407, 6,048,602, 6,050,964, 6,082,683 and 6,117, 259 to Yates. All of these patents are to be incorporated herewith by the specific reference thereto including all specifications and drawings for the purpose of teaching a method for manufacturing the present invention.

Figure 4:
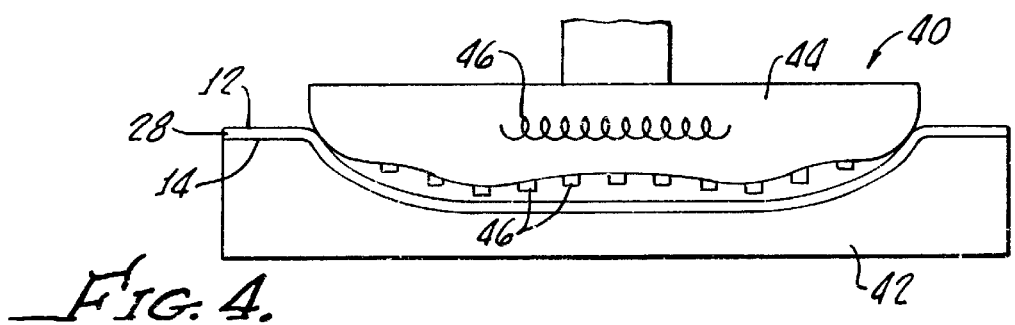
FIG. 4 is a diagram of apparatus suitable manufacture of the cushion in accordance with the present invention.

A brief illustration of apparatus 40 for making a cushion 10 is illustrated in FIG. 4. A cavity mold 42 is provided over which the base sheet 12, cover sheet 14 with the gel 28 therebetween, is positioned.

A pressure mold 44 with engagement prongs 46 is pressed into the base sheet 12, cover sheet 14 and gel 28, penetrating same and providing the openings 20 therethrough while sealing the cover sheet 14 to the base sheet 12 around the holes 20. A heating element 46 may be providing depending upon the type of gel 24 utilized.

The base sheet 12 and the cover sheet 14 may be of any suitable material capable of being sealed, or bonded, to one another for encapsulating the gel 28 therebetween. The use of heat or sonic energy may be utilized.

Although there has been hereinabove described, a breathable cushion in accordance with the present invention for the purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the appended claims.

What is claimed is:

1. A breathable cushion comprising:

a base sheet having a circumference and a matrix of openings therethrough;

a cover sheet having a rectilinear matrix of openings aligned with the matrix of base sheet openings and sealed to said base sheet along the base sheet periphery; and a gel disposed between the base and cover sheets, said gel being continuous between the base sheet and cover sheet openings, said cover sheet being sealed to said base sheet around each of the base sheet openings to form a matrix of pockets, each pocket surrounding a base sheet and cover sheet opening and having a generally square cross-section; and means for facilitating bending of the cushion in order to conform the cushion to a curvilinear surface, said means including alignment of diagonals of each of the square cross-sectional pockets aligned with one another.

2. The cushion according to claim 1 wherein each pocket has a width, measured along the pocket diagonal, greater than a distance between adjacent pockets measured along pocket diagonals in order to alter cushion resiliency.

3. A breathable cushion comprising:

a gel pad having a periphery and a rectilinear matrix of openings therethrough;

a flat base sheet adhered to said gel pad and having a periphery conforming to the gel pad periphery and a matrix of openings aligned with the gel pad openings;

a cover sheet having a periphery sealed to the base sheet periphery and a matrix of openings aligned with the gel pad and base sheet openings, said cover sheet being sealed to said base sheet around each of the base sheets openings to form a matrix of pockets, each pocket surrounding a base sheet, pad and cover sheet opening and having a generally square cross-section; and means for facilitating bending of the cushion in order to conform the cushion to a curvilinear surface, said means including alignment of diagonals of each of the square cross-sectional pockets aligned with one another.

4. The cushion according to claim 3 wherein each pocket has width, measured along the pocket diagonal, greater than a distance between adjacent pockets measured along pocket diagonals in order to alter cushion resiliency.

* * * * *